United States Patent
Jacques et al.

(10) Patent No.: US 10,309,235 B2
(45) Date of Patent: Jun. 4, 2019

(54) SHIPLAP CANTILEVERED STATOR

(75) Inventors: Normand P. Jacques, Marlborough, CT (US); Anthony R. Bifulco, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 2231 days.

(21) Appl. No.: 13/595,443

(22) Filed: Aug. 27, 2012

(65) Prior Publication Data

US 2014/0248140 A1 Sep. 4, 2014

(51) Int. Cl.
| F01D 9/02 | (2006.01) |
| F01D 9/04 | (2006.01) |
| F01D 5/30 | (2006.01) |
| F01D 25/24 | (2006.01) |
| F01D 11/00 | (2006.01) |

(52) U.S. Cl.
CPC .............. *F01D 9/02* (2013.01); *F01D 5/3038* (2013.01); *F01D 9/042* (2013.01); *F01D 11/005* (2013.01); *F01D 25/246* (2013.01); *F05D 2230/60* (2013.01); *F05D 2230/64* (2013.01); *F05D 2230/70* (2013.01); *F05D 2240/12* (2013.01); *F05D 2240/80* (2013.01)

(58) Field of Classification Search
CPC ... F01D 9/02; F01D 9/04; F01D 9/042; F01D 5/303; F01D 5/3038; F01D 5/32; F01D 25/246; F05D 2240/12; F05D 2240/14
USPC ...... 415/91, 139, 159, 185, 191, 196, 208.1, 415/208.2, 209.1; 416/193 A, 212 R, 416/215, 220 R, 224, 238, 239, 248
See application file for complete search history.

(56) References Cited

U.S. PATENT DOCUMENTS

| 4,426,191 A | 1/1984 | Brodell et al. |
| 4,826,397 A * | 5/1989 | Shook ..................... F01D 11/24 415/116 |
| 5,211,537 A | 5/1993 | Langston et al. |
| 5,562,404 A | 10/1996 | Koff et al. |
| 5,950,308 A | 9/1999 | Koff et al. |
| 6,059,525 A * | 5/2000 | Jiomacas .............. F01D 25/246 415/139 |
| 6,296,442 B1 | 10/2001 | Tran |

(Continued)

FOREIGN PATENT DOCUMENTS

| EP | 0899426 | 3/1999 |
| EP | 1106784 A2 | 6/2001 |

(Continued)

OTHER PUBLICATIONS

International Search Report and Written Opinion for International Application No. PCT/US2013/052823 dated May 20, 2014.

(Continued)

*Primary Examiner* — Richard A Edgar
*Assistant Examiner* — Alexander A White
(74) *Attorney, Agent, or Firm* — Carlson, Gaskey & Olds, P.C.

(57) ABSTRACT

A disclosed stator vane assembly includes a plurality of stator vane elements supported within a case about an axis. Each of the plurality of stator vane elements includes a platform having a recess on a first side and a tongue on a second side. The tongue overlaps a recess of an adjacent one of the plurality of stator vane elements with at least one of the recess and the tongue includes a crowned surface forming a seal.

16 Claims, 5 Drawing Sheets

(56) References Cited

U.S. PATENT DOCUMENTS

| | | | |
|---|---|---|---|
| 6,371,725 B1* | 4/2002 | Manteiga | F01D 5/14 |
| | | | 415/209.4 |
| 6,425,738 B1 | 7/2002 | Shaw | |
| 6,821,087 B2* | 11/2004 | Matsumoto | F01D 5/282 |
| | | | 415/191 |
| 6,890,151 B2 | 5/2005 | Bertrand et al. | |
| 7,278,821 B1* | 10/2007 | O'Reilly | F01D 9/042 |
| | | | 29/889.21 |
| 7,946,808 B2 | 5/2011 | Taylor et al. | |
| 8,092,165 B2 | 1/2012 | Bouchard et al. | |
| 8,622,708 B2 | 1/2014 | KÜSters et al. | |
| 2003/0185673 A1 | 10/2003 | Matsumoto et al. | |
| 2009/0097980 A1 | 4/2009 | Hayasaka et al. | |
| 2009/0280011 A1 | 11/2009 | Tibbott | |
| 2010/0124508 A1 | 5/2010 | Liang | |
| 2010/0129211 A1 | 5/2010 | Hart et al. | |
| 2011/0052397 A1 | 3/2011 | Kusters et al. | |
| 2011/0129342 A1 | 6/2011 | Smoke et al. | |

FOREIGN PATENT DOCUMENTS

| | | |
|---|---|---|
| EP | 1970535 A1 | 9/2008 |
| EP | 2146056 | 1/2010 |
| EP | 2204536 | 7/2010 |
| FR | 2967730 A1 | 5/2012 |
| JP | H10141001 | 5/1998 |
| JP | 2001-200701 A | 7/2001 |
| WO | 2013/034857 A2 | 3/2013 |

OTHER PUBLICATIONS

International Preliminary Report on Patentability for International Application No. PCT/US2013/052823 dated Mar. 12, 2015.

European Search Report for EP Application No. 13847190.9 dated Oct. 6, 2016.

Partial Supplementary European Search Report for EP Application No. 13847190.9 dated Jun. 30, 2016.

European Search Report for Application No. 18154981.7. Dated Apr. 18, 2018.

European Search Report for Application No. 18154981.7 dated on Aug. 6, 2018.

* cited by examiner

SHIPLAP CANTILEVERED STATOR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor and turbine sections typically include stages that include rotating airfoils interspersed between fixed vanes in a stator assembly.

Stator assemblies include a plurality of vanes supported between upper and lower platforms. Platforms for each vane are inserted into channels defined within a static structure or case. Loading on the vanes can cause movement within the channels that changes the orientation of the vanes relative to airflow.

Accordingly, it is desirable to design and develop vane assemblies that maintain a desired orientation during all operating conditions.

SUMMARY

A compressor assembly according to an exemplary embodiment of this disclosure, among other possible things includes a case disposed about an axis, and a stator vane supported within the case which includes a platform with a first side including a recess and a second side including a tongue for overlapping a recess on a platform of an adjacent stator vane. Both the first side and the second side are disposed at an angle relative to the axis.

In a further embodiment of the foregoing compressor assembly, the angle is between about 5° and 45° degrees.

In a further embodiment of any of the foregoing compressor assemblies, the first side is substantially parallel with the second side.

In a further embodiment of any of the foregoing compressor assemblies, one of the recess and the tongue include a crowned surface forming a seal with the other of the recess and the tongue.

In a further embodiment of any of the foregoing compressor assemblies, includes hooks extending from front and back sides of the platform and received within channels defined within an interior of the case, the hooks are disposed parallel to the axis.

In a further embodiment of any of the foregoing compressor assemblies, includes a liner disposed between each of the hooks and the channels for reducing wear and providing damping between the stator vane and the case.

In a further embodiment of any of the foregoing compressor assemblies, includes a plurality of stator vanes supported within the case about the axis, and at least one of the plurality of stator vanes includes an anti-rotation feature for preventing rotation of the plurality of stator vanes about the axis.

In a further embodiment of any of the foregoing compressor assemblies, the anti-rotation feature includes a boss defining an opening for receiving a pin attached to the case.

A stator vane stage according to an exemplary embodiment of this disclosure, among other possible things includes a plurality of stator vanes supported within a case about an axis. Each of the plurality of stator vanes includes a platform having a recess on a first side and a tongue on a second side. The tongue overlaps a recess of an adjacent one of the plurality of stator vane. At least one of the recess and the tongue includes a crowned surface forming a seal.

In a further embodiment of the foregoing stator vane stage, the first side and the second side are disposed at an angle relative to the axis.

In a further embodiment of any of the foregoing stator vane stages, the first side is substantially parallel to the second side.

In a further embodiment of any of the foregoing stator vane stages, at least one of the plurality of stator vanes includes a boss defining an opening for receiving a pin attached to the case for preventing rotation of the plurality of stator vanes relative to the case.

In a further embodiment of any of the foregoing stator vane stages, the platform for each of the stator vanes include hooks received within channels of the case and a liner disposed between the hooks and the channel for reducing wear.

A stator vane according to an exemplary embodiment of this disclosure, among other possible things includes a platform including a first side having a recess, a second side having a tongue, and first and second ends having hooks. The tongue overlaps a recess on an adjacent stator vane, and an airfoil extends from the platform. First and second sides are disposed at a non-normal angle relative to the first and second ends.

In a further embodiment of the foregoing stator vane, includes a crowned surface on one of the recess and the tongue for forming a seal at the interface between a recess and a tongue of adjacent stator vanes.

In a further embodiment of any of the foregoing stator vanes, includes a boss on a side of the platform opposite the airfoil that includes an opening for receiving a pin to substantially prevent rotation relative to a case.

In a further embodiment of any of the foregoing stator vanes, the tongue and recess are loaded into sealing contact by loading from gas flow to prevent leakage through an interface between the tongue and the recess.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
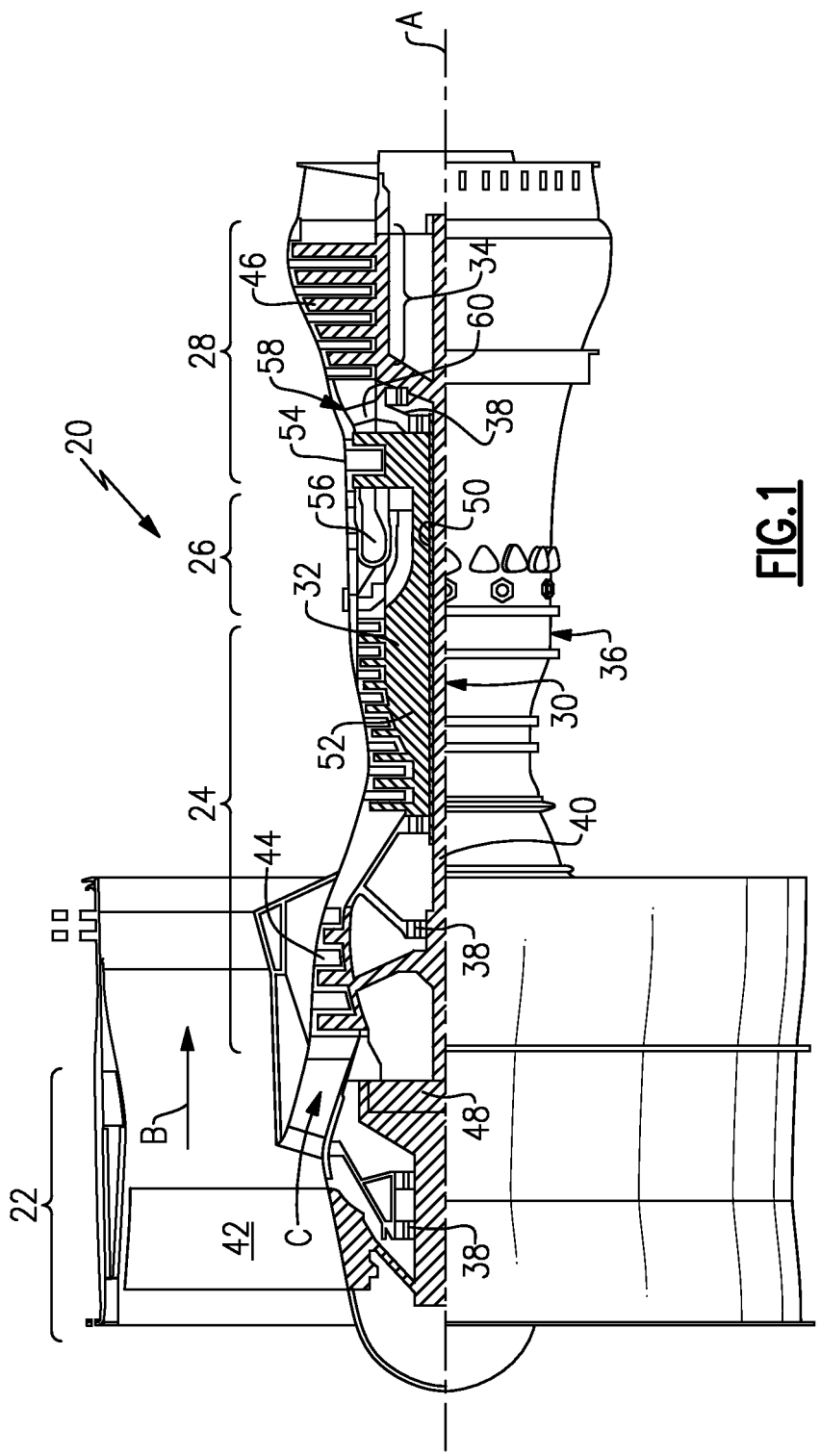
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\,°R)/518.7]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
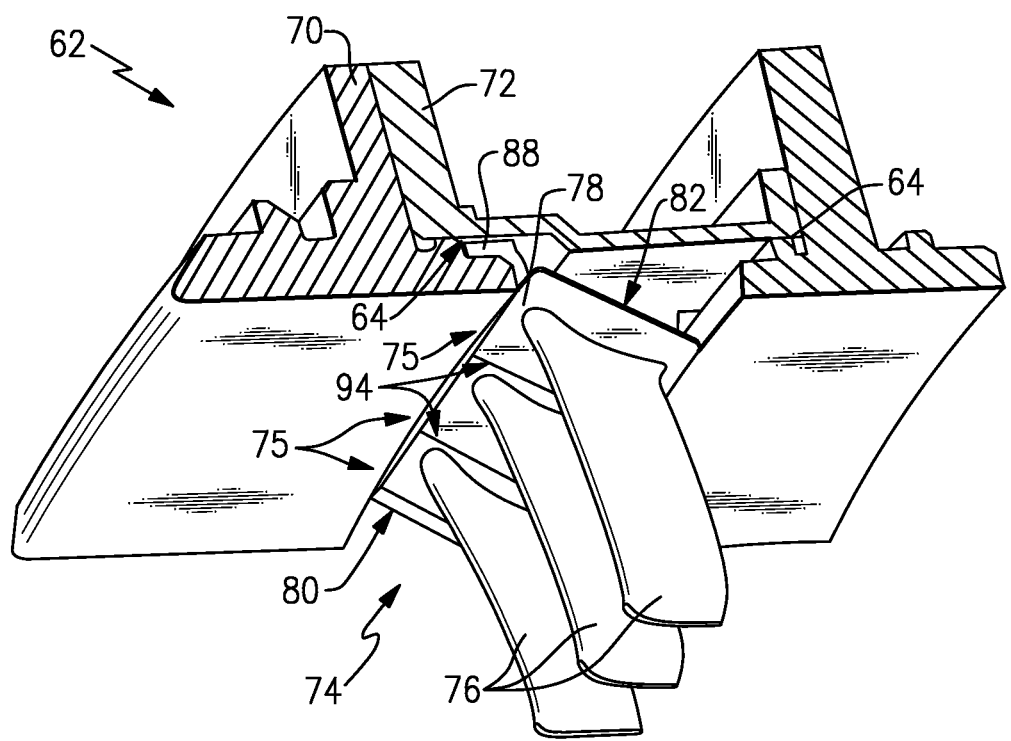
FIG. 2 is a schematic view of an example stator assembly within a compressor case.

Referring to FIG. 2, an example stator assembly 74 is supported within a high pressure compressor case 62. The stator assembly 74 includes a plurality of stator vane elements 75. In this example, the high pressure compressor case 62 includes a first part 70, and a second part 72. The high pressure compressor case 62 includes channels 64 that receive hooks 88 of the individual stator vane elements 75 that support the individual stator vane elements 75, and thereby the stator assembly 74 within the second part 72. The hooks 88 that are disposed within the channels 64 defined by the second part 72 extend from first and second ends 84, 86 in a direction parallel to the axis A and prevent movement of each of the stator vane elements 75 in an axial direction. The channels 64 could also be formed as part of one piece case 62.

Each individual vane element 75 includes an airfoil 76 that extends from a platform 78. Each of the platforms 78 includes a first side 80 and a second side 82. Between each of the stator vane elements 75 is an interface 94 formed by a recess on the first side 80 and a tongue on the second side 82 of each vane element 75.

Figure 3:
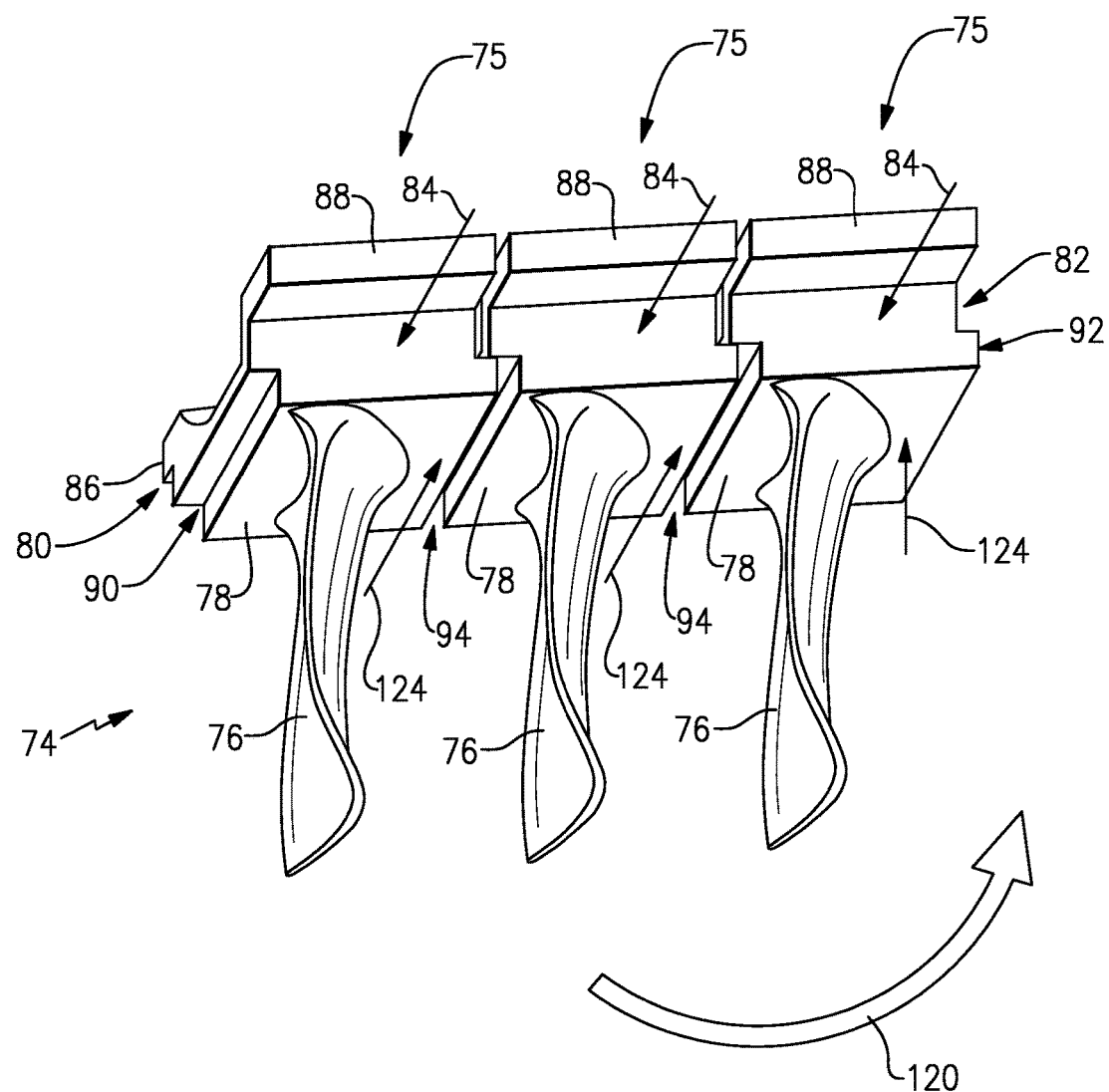
FIG. 3 is an example view of a stator assembly.

Referring to FIG. 3, during operation gas flow through the airfoils 76 generate rotational forces indicated by arrow 120. The rotational forces 120 can cause slight rotation of the airfoils 76, thereby changing an orientation of the airfoil 76 relative to gas flow. The example stator elements 75 include features for reducing and/or eliminating rotation caused by the forces in the direction indicated by arrow 120.

Each of the stator vane elements 75 includes the platform 78 with first side 80 and second side 82. The first side 80 includes the recess 90 and the second side 82 includes a tongue 92. The tongue 92 overlaps a corresponding recess 90 on an adjacent one of the stator vane elements 75. The overlapping tongue portion 92 applies a force indicated by arrows 124 on the adjacent vane element recess 90 that counters the tangential moment component forces generated by the gas load on the airfoil 76. Moreover, the overlapping tongue 92 maintains a counterbalancing force 124 on the adjacent vane element 75 to prevent rotation caused by the gas load indicated by arrow 120.

Figure 5:
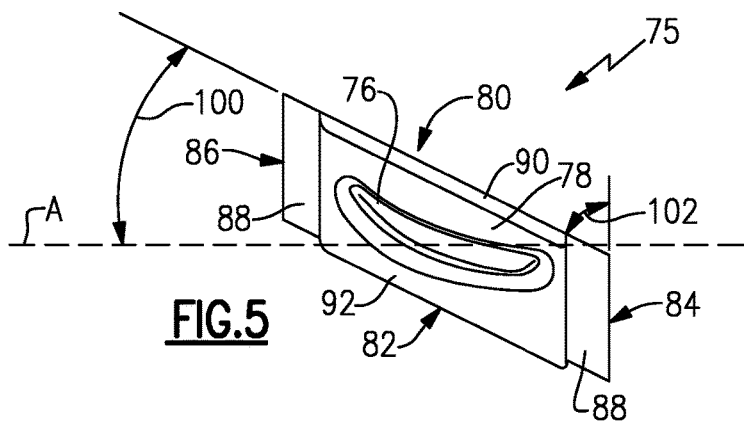
FIG. 5 is a top view of the example stator vane element.
Figure 4:
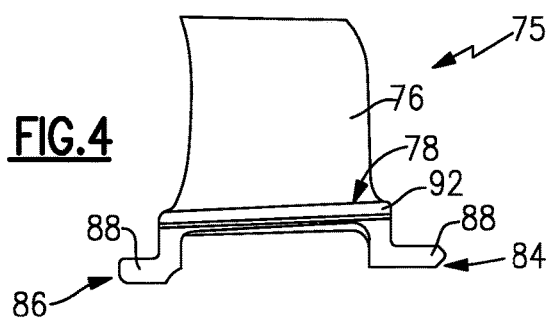
FIG. 4 is a side view of an example stator vane element.
Figure 6:
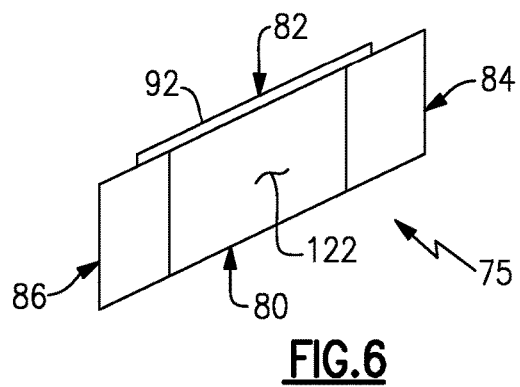
FIG. 6 is a bottom view of the example stator vane element.

Referring to FIGS. 4, 5, and 6 with continued reference to FIG. 3, each of the first side 80 and second side 82 are disposed at an angle 100 relative to the a line parallel to the axis A. The airfoil 76 is disposed opposite side 122 that faces the second part 72 when installed within the channels 64. The example angle 100 is between 5° and 45° with respect to the axis of rotation of the gas turbine engine. Although an example angle 100 is disclosed other angles could be utilized and are within the contemplation of this disclosure. The angular orientation of the first and second sides 80, 82 provides for an increased application of forces 124 to aid in preventing rotation of each vane element 75 caused by the gas load on the airfoil 76.

In this example, the first and second sides 80, 82 are disposed parallel to each other at the angle 100 relative to the axis A. Moreover, the first and second sides 80 and 82 are disposed at an angle 102 relative to the ends 84 and 86. As appreciated, the ends 84 and 86 are also parallel to one another and are arranged to fit within the channels 64 defined within the case 62.

The recess 90 and the tongue 92 overlap to generate a shiplapped interface 94 between adjacent vane elements 75. The shiplap interface 94 provides a desired sealing function while also maintaining and countering forces caused by tangential component of gas load on the airfoil 76.

Figure 7:
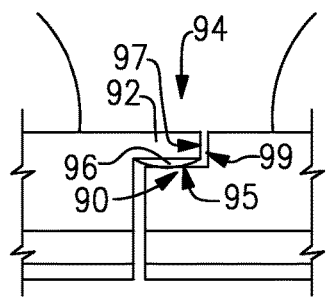
FIG. 7 is an enlarged view of an interface between adjacent stator vane elements.

Referring to FIG. 7, the sealing function at the interface 94 between the tongue 92 and recess 90 is further improved through the use of a crowning surface 96 on one of the tongue 92 and recess 90. The example interface 94 includes the tongue 92 having a crown surface 96. The crown surface 96 engages the recess 90 at a line contact indicated at 95 that distributes forces along tongue and recess contract line to provide an improved seal between vane elements 75. Crown may be on one or both tongue and recess surfaces 96 and 98. Vertical surfaces of tongue 97 and recess 99 maintain contact along entire extend of tongue and recess.

Figure 8:
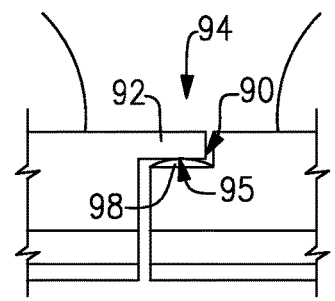
FIG. 8 is another side view of interface between adjacent stator vane elements.

Referring to FIG. 8, another example interface 94 includes a crown surface 98 disposed on the recess 90 that engages a bottom surface of the tongue 92. The interface between the tongue 98 and the recess 90 is a line contact 95. The line contact 95 distributes applied forces in a line contact to improve sealing between adjacent vane elements 75.

Figure 9:
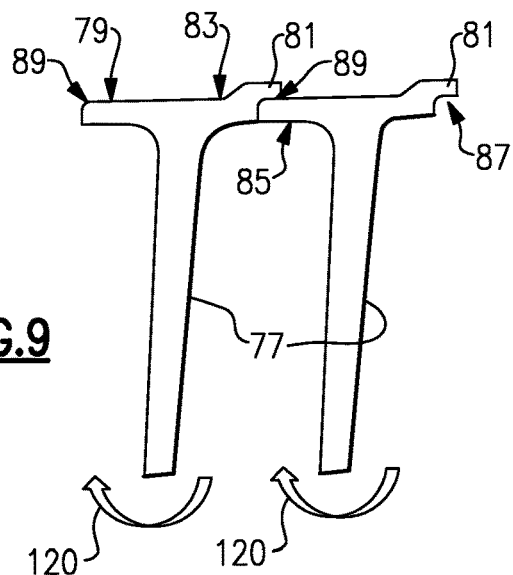
FIG. 9 is another example stator vane

Referring to FIG. 9, in another disclosed example embodiment, a vane element 77 includes a platform 79 with a gas path side 85 and a non-gas path side 83. The platform includes a tongue 81 that overlaps a portion 89 of an adjacent vane element 77. The tongue 81 defines an overlap 87 that fits over the non-gas path side 83 of the adjacent vane element 77 to provide the desired sealing between the gas path side 85 and the non-gas path side 83.

Figure 10:
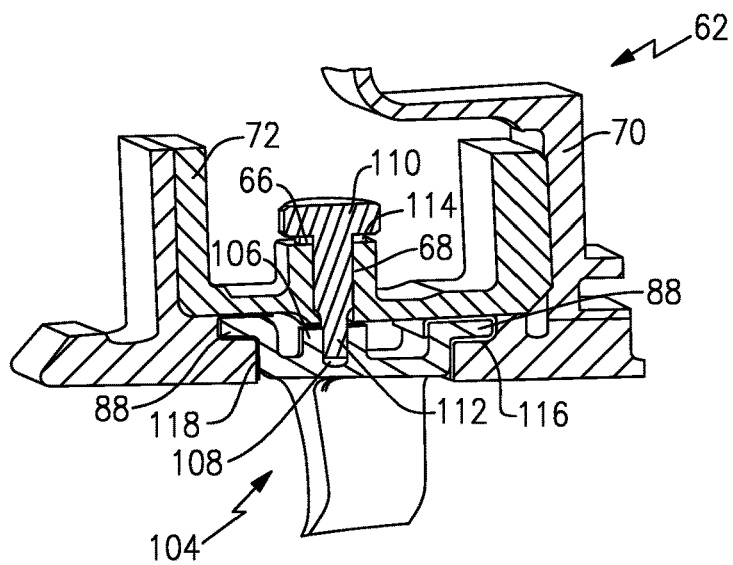
FIG. 10 is a perspective view of an anti-rotation vane.
Figure 11:
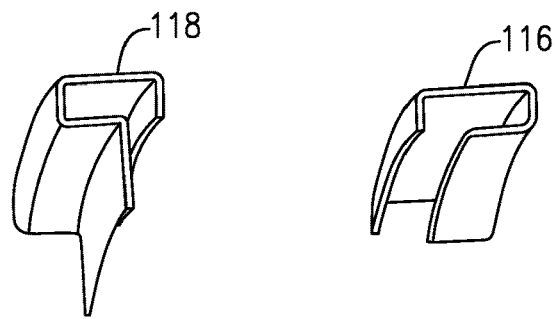
FIG. 11 is a perspective view of example liners.

Referring to FIG. 10, an example anti-rotation vane 104 is disposed within the plurality of vane elements 75 comprising the stator assembly 74. As appreciated, each of the vane elements 75 is secured within the channel 64 of the case 62. However, without an anti-rotation feature the combination of the gas load and airfoil configuration could cause rotation of the various vane elements 75 within the channels 64. Accordingly, in this example, an anti-rotation vane element 104 is provided at circumferential intervals about the circumference of the stator assembly 74.

The example anti-rotation stator vane element 104 includes a boss 106 that defines an opening 108 that receives an end 112 of a pin 110. The pin 110 engages threads 68 within opening 66 defined within the case portion 72. A tab washer 114 is disposed between the pin 110 and the case 72 to prevent loosening of the pin 110 once in an assembled condition. The end of the pin 112 is not threaded and is received within the opening 108 defined within the boss 106 of the anti-rotation vane 104. Mistake proof assembly of vanes can be achieved by providing an anti-rotation boss on all vanes except drilled hole in boss is omitted on non-locking vanes preventing insertion of locking pin and engagement of threaded feature on pin with threads in case 72.

FIG. 9 illustrates a single anti-rotation vane element 104; however, several anti-rotation vane elements 104 would be disposed throughout the stator assembly 74 to provide the desired anti-rotation function. In one example, eight anti-rotation vane elements 104 are disposed about the circumference of the stator assembly 74 at 45° circumferential intervals. As appreciated, although in the disclosed example eight anti-rotation vanes 104 are spaced apart circumferentially within the stator assembly 74, other numbers of anti-rotation vane elements 104 could be utilized as is required to provide the desired anti-rotation function. The example anti-rotation vane 104 also includes a tongue 92 and recess 90 such that it will fit and provide the desired sealing interface 94 with adjacent vane elements 75. Placement of pin and vane anti-rotation boss in a radial orientation in-line with the center of pressure of vane gas loads at the aero design point eliminates vane rotation about a radial line ensuring optimal vane position at the aero design point.

Assembly and disassembly of compressor stages is aided by the anti-rotation pin 110 and vane platform 78 geometry by preventing vane elements 75 from disengaging from the case 62 during disassembly. The interface of the pin 110 is circular and mates with the concentric opening 108 in the anti-rotation boss 106 minimizing contact stress between the anti-rotation pin 110 and vane element 104.

Referring to FIG. 10 with continued reference to FIG. 9, liners 118 and 116 are disposed between hooks 88 and the surface of the channel 64. The liners 116 and 118 prevent wear of the case 62 and specifically the surfaces of the channel 64. The liners 116 and 118 are formed of the material that capture the vane hooks 88 and reduce wear on the case through operation and provide damping between vane 76 and case 72. Although the tongue and groove interface 94 provided on adjacent vane element 75 significantly reduces rocking and rotation of each of vane elements. Some rotation does occur and some movement is compensated due to the thermal growth along with the gas load asserted on the vanes 76 of the stator assembly 74. The liners 116 and 118 provide a barrier between each of the vane elements 75 and the case 62 to reduce wear and lengthen the operational life of the stator vane assembly 74.

Accordingly, the example shiplapped interface 94 between adjacent stator vane elements 75 prevents leakage and provide damping while also significantly improving and limiting movement of vane assemblies out of the desired positions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A compressor assembly comprising:
a case disposed about an axis; and
a stator vane supported within the case and including a platform with a first side including a recess and a second side including a tongue for overlapping a recess on a platform of an adjacent stator vane, wherein both the first side and the second side are disposed at an angle relative to the axis.

2. The compressor assembly as recited in claim 1, wherein the angle is between about 5° and 45° degrees.

3. The compressor assembly as recited in claim 1, wherein the first side is substantially parallel with the second side.

4. The compressor assembly as recited in claim 1, wherein one of the recess and the tongue include a crowned surface forming a seal with the other of the recess and the tongue.

5. The compressor assembly as recited in claim 1, including hooks extending from front and back sides of the platform and received within channels defined within an interior of the case, wherein the hooks are disposed parallel to the axis.

6. The compressor assembly as recited in claim 5, including a liner disposed between each of the hooks and the channels for reducing wear and providing damping between the stator vane and the case.

7. The compressor assembly as recited in claim 1, including a plurality of stator vanes supported within the case about the axis, and at least one of the plurality of stator vanes includes an anti-rotation feature for preventing rotation of the plurality of stator vanes about the axis.

8. The compressor assembly as recited in claim 7, wherein the anti-rotation feature includes a boss defining an opening for receiving a pin attached to the case.

9. A stator vane stage comprising:
a plurality of stator vanes supported within a case about an axis, wherein each of the plurality of stator vanes includes a platform having a recess on a first side and a tongue on a second side, wherein the tongue overlaps a recess of an adjacent one of the plurality of stator vanes, wherein at least one of the recess and the tongue includes a crowned surface forming a seal.

10. The stator vane stage as recited in claim 9, wherein the first side and the second side are disposed at an angle relative to the axis.

11. The stator vane stage as recited in claim 9, wherein the first side is substantially parallel to the second side.

12. The stator vane stage as recited in claim 9, wherein at least one of the plurality of stator vanes includes a boss defining an opening for receiving a pin attached to the case for preventing rotation of the plurality of stator vanes relative to the case.

13. The stator vane stage as recited in claim 12, wherein the platform for each of the stator vanes includes hooks received within channels of the case and a liner disposed between the hooks and the channel for reducing wear.

14. The stator vane stage as recited in claim 9, wherein the tongue is disposed on a gas path side of the platform.

15. The stator vane stage as recited in claim 9, wherein the tongue is disposed on a non-gas path side of the platform.

16. A stator vane comprising: a platform including a first side having a recess, a second side having a tongue, and first and second ends having hooks, wherein the tongue overlaps a recess on an adjacent stator vane; and an airfoil extending from the platform, wherein first and second sides are disposed at a non-normal angle relative to the first and second ends, including a crowned surface on one of the recess and the tongue for forming a seal at the interface between a recess and a tongue of adjacent stator vanes.

* * * * *